United States Patent
Li

(10) Patent No.: US 10,228,599 B1
(45) Date of Patent: Mar. 12, 2019

(54) BISTABLE LIQUID CRYSTAL DISPLAY AND WRITING DEVICE WITH HIGH BRIGHTNESS AND CONTRAST

(71) Applicant: Wicue, Inc., Cupertino, CA (US)

(72) Inventor: Fenghua Li, San Jose, CA (US)

(73) Assignee: Wicue, Inc., Cupertino, CA (US)

( * ) Notice: Subject to any disclaimer, the term of this patent is extended or adjusted under 35 U.S.C. 154(b) by 49 days.

(21) Appl. No.: 15/237,568

(22) Filed: Aug. 15, 2016

Related U.S. Application Data

(60) Provisional application No. 62/205,521, filed on Aug. 14, 2015.

(51) Int. Cl.
| | | |
|---|---|---|
| *G02F 1/1333* | (2006.01) | |
| *G02F 1/137* | (2006.01) | |
| *G02F 1/1335* | (2006.01) | |
| *G02F 1/1334* | (2006.01) | |
| *G02F 1/133* | (2006.01) | |
| *G06F 3/041* | (2006.01) | |

(52) U.S. Cl.
CPC ............ *G02F 1/137* (2013.01); *G02F 1/1334* (2013.01); *G02F 1/13306* (2013.01); *G02F 1/13338* (2013.01); *G02F 1/133504* (2013.01); *G02F 1/133553* (2013.01); *G06F 3/0412* (2013.01); *G06F 3/0414* (2013.01); *G02F 2001/13756* (2013.01); *G02F 2202/023* (2013.01); *G02F 2203/02* (2013.01); *G02F 2203/03* (2013.01); *G06F 2203/04103* (2013.01)

(58) Field of Classification Search
CPC ....... G02B 6/35; G02F 1/137; G02F 1/13338; G02F 1/133504; G02F 1/133553; G02F 1/1334; G02F 1/13306; G02F 2202/023; G02F 2203/02; G02F 2203/03; G02F 2001/13756; G06F 3/0414; G06F 3/0412; G06F 2203/04103
USPC .......................................................... 349/12
See application file for complete search history.

(56) References Cited

U.S. PATENT DOCUMENTS

| | | | |
|---|---|---|---|
| 6,909,485 B2 * | 6/2005 | Yoon ................. | G02F 1/133514 349/106 |
| 2004/0105614 A1 * | 6/2004 | Kobayashi ............ | G02F 1/1354 385/16 |

* cited by examiner

*Primary Examiner* — Charles Chang
(74) *Attorney, Agent, or Firm* — Foley & Lardner LLP

(57) ABSTRACT

Embodiments are disclosed for a liquid crystal display and writing device that has a high brightness and a high contrast ratio. The device includes a first two conductive layers and a liquid crystal film between the conductive layers. The liquid crystal film includes a first liquid crystal layer, a second liquid crystal layer and a middle polymer layer between the first and second liquid crystal layers. The first and second liquid crystal layers are configured to switch from a light scattering state to a light reflective state to display content. The first and second liquid crystal layers are further configured to switch from the light reflective state to the light scattering state to erase the content.

22 Claims, 4 Drawing Sheets

BISTABLE LIQUID CRYSTAL DISPLAY AND WRITING DEVICE WITH HIGH BRIGHTNESS AND CONTRAST

CROSS-REFERENCE TO RELATED APPLICATION

This application claims the benefit of U.S. Provisional Patent Application No. 62/205,521, entitled "METHOD AND DEVICE OF BISTABLE LIQUID CRYSTAL WRITING WITH HIGH BRIGHTNESS AND CONTRAST," which was filed on Aug. 14, 2015, which is incorporated by reference herein in its entirety.

FIELD OF THE INVENTION

At least one embodiment of the technology relates to liquid crystal display devices, and more particularly, to liquid crystal display and writing devices.

BACKGROUND

Liquid crystals (LCs) have properties between conventional liquids and solid crystals. A liquid crystal flows like a liquid but molecules of the liquid crystal can be oriented in a way like a solid crystal. In different phases of the liquid crystal, the optical properties are different. Electronic display devices can include liquid crystal cells to display various types of information.

SUMMARY

The disclosed technology relates to a liquid crystal (LC) display and writing device that has high brightness and contrast. The LC display and writing device includes a first and second conductive layers and a middle active section sandwiched between the conductive layers. The middle active section includes two liquid crystal (LC) layers and a polymer layer sandwiched between the LC layers. The second conductive layer can have a background color (e.g. a dark color to mimic a background of a blackboard). The conductive layers can sense mechanical pressure applied on the surface of the LC display and writing device. Users can write on the flexible pressure-sensitive surface of the LC device by applying mechanical stress. In response, the LC device can display the writing traces with vivid color using the liquid crystals. The display of the writing can be bright so that the writing can be seen over a far distance in ambient light. The middle active section with LC/polymer/LC layers can be made by roll-to-roll manufacturing method. Such an LC/polymer/LC layered structure can achieve a better brightness and a higher contrast ratio than a single layer of mixed LC and polymer.

DETAILED DESCRIPTION

Figure 1:
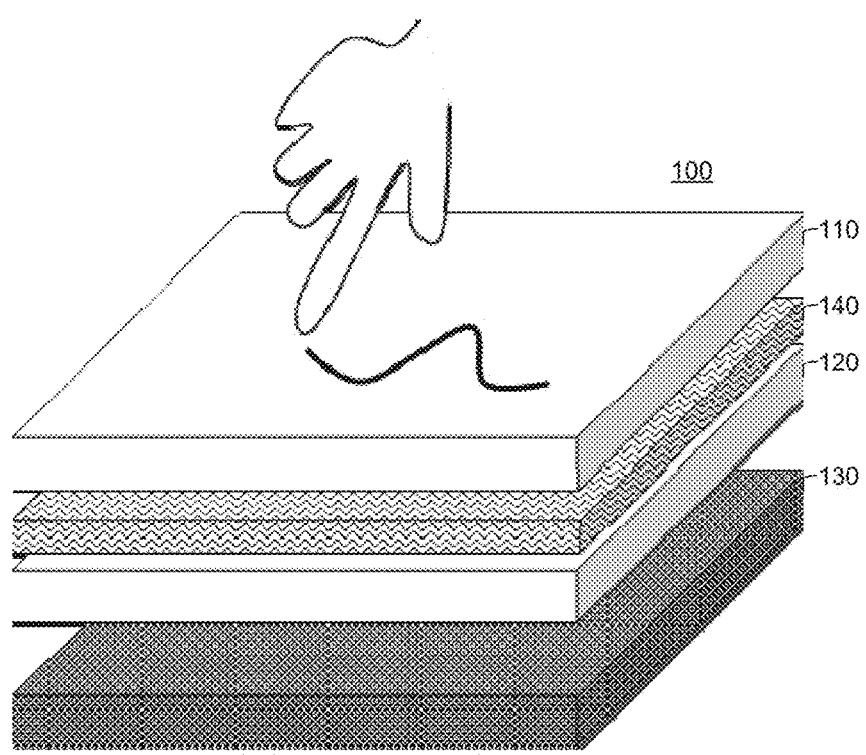
FIG. 1 illustrates an example of a liquid crystal display and writing device, according to various embodiments of the technology.

A technology for bistable liquid crystal display and writing devices are disclosed herein. A bistable liquid crystal device can include cholesteric liquid crystal (CLC) which is a liquid crystal that is organized in layers. The CLC has a helical structure and is therefore chiral. The LC molecules in each layer of the CLC are oriented in a direction, which varies with layers. The period of the variation of the layer-specific molecular orientation directions is called pitch. The pitch determines the wavelength of light that the CLC structure reflects.

The CLC is characterized by stable states including a focal conic state and a planar state. In the focal conic state, the CLC is light scattering and appears dark. In the planar state, the CLC is light reflective and appears bright. Electronic display devices can take advantage of the light-modulating properties of CLC for displaying to achieve a bistable display.

The bistable LC device has a low power consumption. After content is shown on the device, the bistable LC display does not need electric voltage to hold the display content until it is switched to a new display content. The cholesteric liquid crystal (CLC) includes both a light scattering focal conic texture and a light reflective planar texture, in which the chiral dopant has a pitch length reflecting light in the human-visible spectrum.

In some embodiments, the bistable LC device also include polymer and the polymer network is distributed uniformly holding the LC domains. The LC and polymers (or monomers) are mixed at a proper proportion and is cured by UV radiation. An application of a mechanical stress to the layer of a mixture of cholesteric LC and polymer would change an initial light scattering focal conic texture to the light reflective planar texture to display the writing. A short electrical pulse with an enough voltage to the liquid crystal sandwiched between two conductive layers returns the reflective planar texture back into initial light scattering focal conic texture, erasing the writing. This provides a writing technology that potentially replaces paper and eliminates a need for ink and dry erase markers.

However, the brightness and contrast ratio of the LC device with a mixture of CLC and polymers may not be high enough for viewers to recognize the writing from a far distance, such as 5 meters away. The reason is that the polymer around the cholesteric liquid crystal domain scatter the light and negatively affects the reflectance of planar structure of the cholesteric liquid crystal. The purpose of mixing the CLC with polymer additive is that the polymers stabilize the writing surface of CLC. The polymer is dispersed inside the liquid crystal host and they mix well with each other. The mixed layer of the CLC and polymers can be produced by a roll-to-roll method.

The mechanical stress on the writing surface causes the CLC to switch to the light reflective planar texture for displaying the writing traces. However, dispersing CLCs in a polymer matrix can result in the formation of spherical or ellipses droplets of CLC. The geometry of the CLC domain and polymer network mixed structure significantly influences their reflection characteristics. For example, a pure CLC structure can reflect 50% of the ambient (unpolarized) light because circularly polarized light of the same handedness as the helix is reflected. Light is selectively reflected from the CLC structure when the wavelength matches the pitch of the helix of the CLC structure. The reflected light is circularly polarized with the same handedness as the helix. Thus, the pure CLC structure can reflect 50% of the unpolarized incident light.

While pure CLC structure can show vivid color, the mixed structure of CLC and polymers may not achieve the color appearance of the pure CLC and has a weak reflection due to scattering between polymer and CLC boundaries. Because of light scattering of the dispersed polymer structure in the mixture layer, the light reflectance of the light reflective planar state of the CLC is weakened.

Furthermore, surface anchoring of polymer domain aligns cholesteric liquid crystal helices into different orientations. Thus, the reflectance of planar structure of the LC device is not at an optimized level since not all cholesteric liquid crystal molecules are at a perfectly aligned cholesteric helical structure. Therefore, even though the mixture layer of the CLC and polymers can be conveniently produced by a roll-to-roll method, such an LC device cannot achieve a high brightness and a high contract ratio.

FIG. 1 illustrates an example of a liquid crystal (LC) display and writing device 100, according to the disclosed technology. The LC device 100 can include a first conductive layer 110, a second conductive layer 120, and a middle active section 140 (also referred to as liquid crystal film, active layer, or active section) sandwiched between the conductive layers 110 and 120. The LC device 100 can further include a substrate 130 for providing additional mechanical strength.

Figure 2:
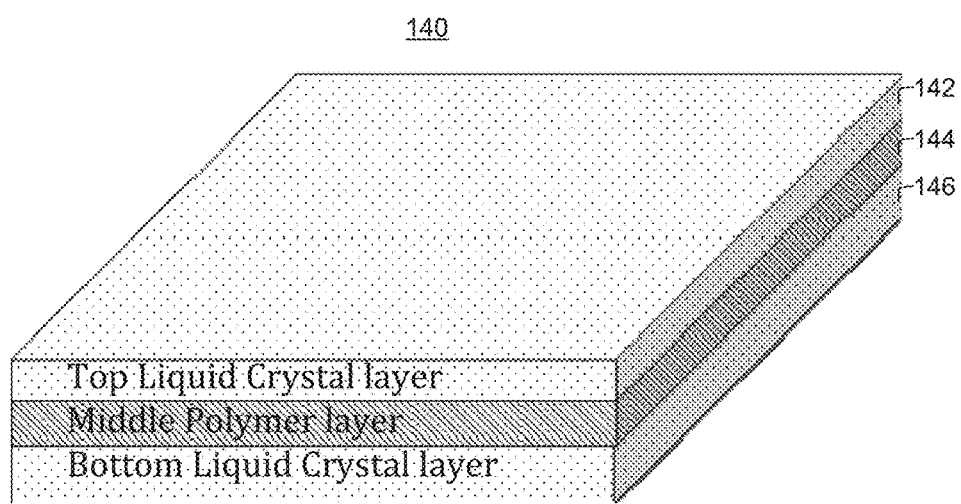
FIG. 2 illustrates an example of layers of a layered liquid crystal film, according to various embodiments of the technology.

FIG. 2 illustrates an example of layers of the layered liquid crystal film 140. The liquid crystal film 140 can include a first liquid crystal (LC) layer 142, a second LC layer 146, and a polymer layer 144 sandwiched between the LC layers 142 and 146. The LC layers 142 and 146 can include, e.g., cells of cholesteric liquid crystals. The layered structure of the liquid crystal film 140 can achieve a high brightness and a high contrast ratio. The LC device 100 is different from a LC device including a mixture of LC and polymers, because the layered structure of the LC device 100 separates the LC and polymers into different layers. In contract, in the LC device includes a mixture of LC and polymers, and the LC and polymers are well mixed and form a single uniform layer (or film).

Such a LC device 100 has advantages over the devices including mixtures of LC and polymers. The LC device 100 can display a high brightness and a high contrast ratio, even for large size writing boards that could be used as blackboard in classroom, whiteboard in conference room and signs in public place. Comparing to the device including a mixture of LC and polymers, the LC device 100 can have a significantly higher brightness and/or contrast ratio due to the fact that the light is reflected directly from the first LC layer 142 which contains no or very little polymers.

The LC device 100 has an ink-free bistable writing surface with layers of LC and polymers that can be made by a convenient and cost-effective roll-to-roll manufacturing method, due to the strong holding force from the polymer layer 144. Once the layers of LC and polymers are produced using the roll-to-roll method, the polymers can be cured (e.g., hardened or toughened) by UV (ultraviolet) curing process or thermal curing process. Once the polymer layer is cured, the polymers within the middle polymer layer 144 remain separated from the liquid crystal molecules within the first and second LC layers 142 and 146. In other words, the polymers and the liquid crystal molecules do not spontaneously mix together.

Furthermore, because of the sufficient polymer concentration for roll-to-roll manufacturing, the liquid crystal film has a strong mechanical property. Such a LC device 100 decouples the originally conflicting roll-to-roll method and the needs for a high brightness and contrast. The ink-free bistable LC/Polymer writing film can be made by roll-to-roll manufacturing method to display content with a high brightness and a high contrast ratio. The LC device 100 can show vivid color with a high reflectance level (e.g., close to 50% of ambient light) for the writing trace in response to a user writing on the surface of the device 100.

In some embodiments, the first LC layer 142 and the second LC layer 146 can include a small amount of polymers permeated inside of the LC layers 142 and 146. The polymers can be permeated, e.g., from the middle polymer layer 144 to the LC layers 142 and 146. The small amount of permeated polymers can help strengthening the mechanical structure of the liquid crystal film 140, and keeping the LC layers 142 and 146 bistable when those LC layers are switched between planar and scattering states. The concentration of permeated polymer in those LC layers can be, e.g., about 0.1% to 29%. In contrast, a device including a mixture of LC and polymers can have a concentration of, e.g., about 10%-40% of polymers in the single mixture layer of LC and polymers.

In some embodiments, the middle plyer layer 144 can include a small amount of LC molecules permeated, e.g., from the LC layers 142 and 146. The small amount of permeated LC molecules can improve the transmittance of the liquid crystal film 140 at light scattering state due to the index matching from the existence of the LC molecules.

Figure 3:
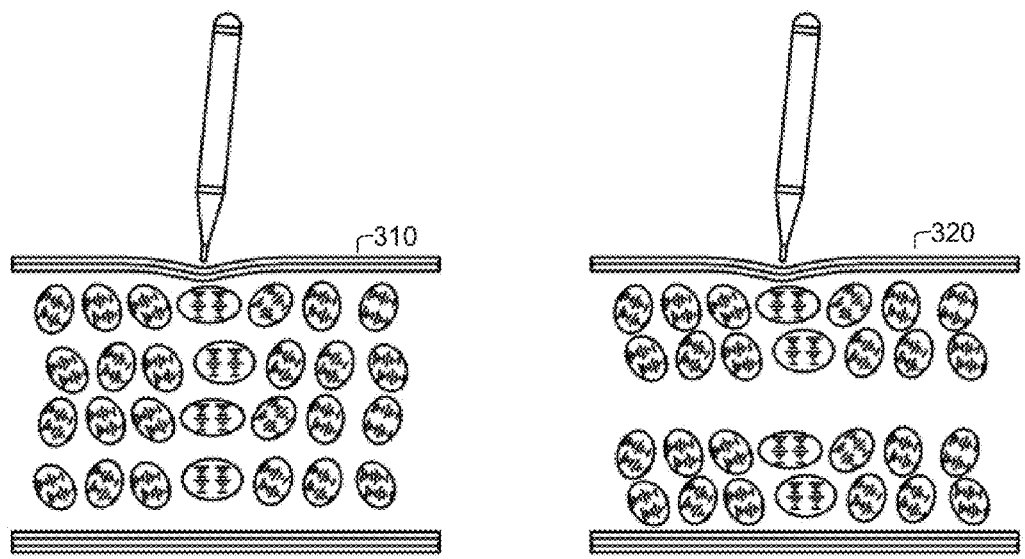
FIG. 3 illustrates a comparison between a liquid crystal device including a mixture of liquid crystals and polymers and a liquid crystal device including a layered liquid crystal film as illustrated in FIG. 2.

FIG. 3 illustrates a comparison between a liquid crystal device including a mixture of liquid crystals and polymers and a liquid crystal device including a layered liquid crystal film as illustrated in FIG. 2. The left side of FIG. 3 shows a liquid crystal device 310 including a single layer of a uniform domain structure of a mixture of liquid crystals and polymers. The right side of FIG. 2 shows a liquid crystal device 320 including a triple layer structure with separated LC and polymers. In the top and bottom liquid crystal layer, there can be mainly liquid crystal materials with a small amount of polymers. In the middle polymer layer, there can be mainly polymers with small amount of LC concentration.

In some embodiments, the LC device 100 has a higher driving voltage than a driving voltage of a device including a mixture of LC and polymers. This is because the liquid crystal is separated from the conductive layers 110 and 120 by the middle polymer layer 144.

In some alternative embodiments, a liquid crystal film can have a number of layers different from a triple-layer structure. For example, the liquid crystal film 140 as illustrated in FIG. 2 can be replaced with a liquid crystal film including a two-layer structure. The two-layer structure can include two fully or partially separated LC and polymer layers.

The LC device 100 can be used in various applications. For example, in some embodiments, a high brightness liquid crystal writing tablet at large size up to 1.2 meter by 4 meter can be made using the high brightness liquid crystal writing technology disclosed herein. The writing images are much brighter than other liquid devices. Such a device is reliable, fast and can be effectively manufactured using roll-to-roll method at a low cost. The content display area of the device has a large width and a good color uniformity. The device can serve as replacement of blackboards in classrooms and whiteboards in meeting rooms, as the device has advantages over other LC devices, which have low brightness due to the existence of polymers dispersed in the LC.

As discussed above, the polymers will make the reflectance of cholesteric LC weaker because the surface anchoring of polymer domain aligns cholesteric liquid crystal helix into different orientation. The LC device 100 can avoid the weakened reflectance effect due to the dispersed polymer and can still be produced using roll-to-roll method. A blackboard (or whiteboard) based on the LC device 100 can provide a large and eco-friendly writing device for teachers, to avoid the chalk dust and eliminate the need of the costly dry erase marker for the whiteboard.

Figure 4:
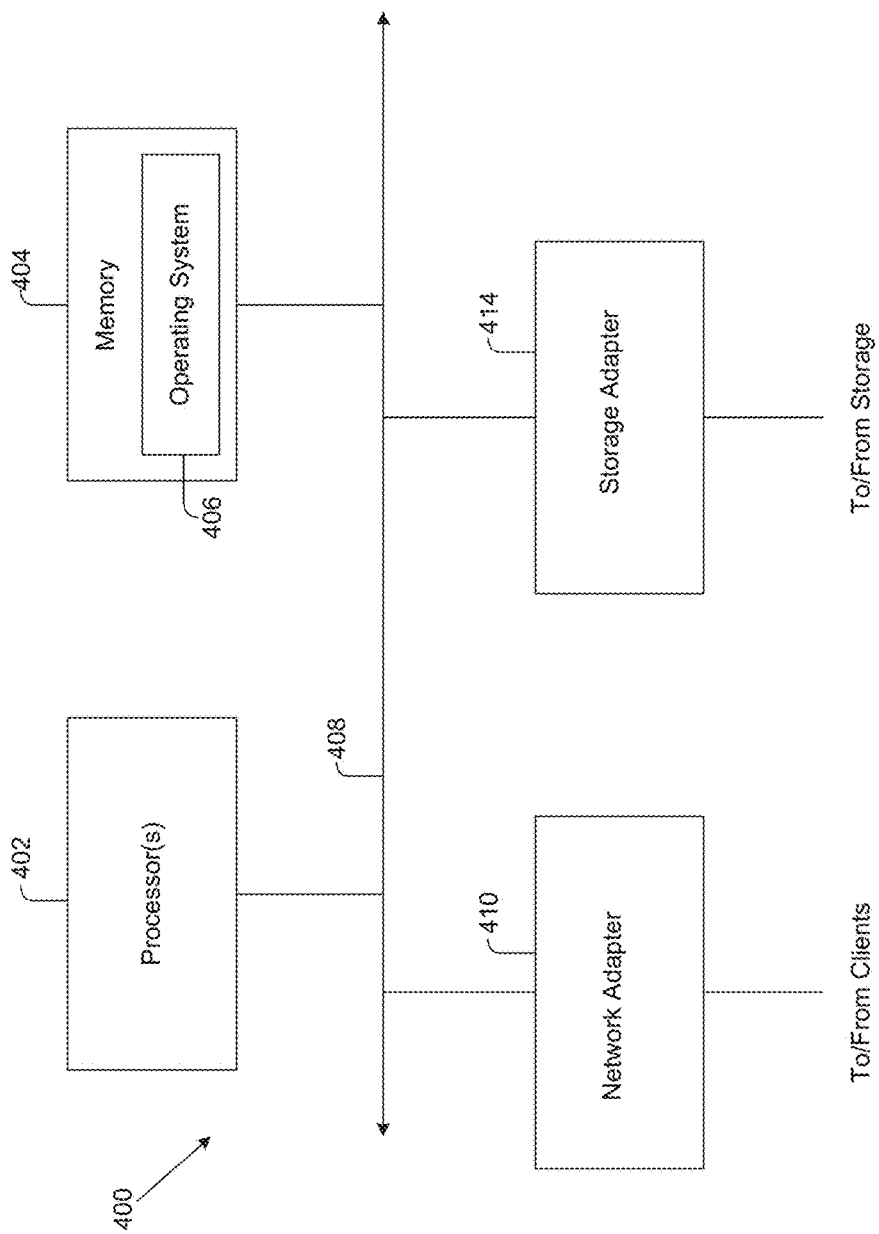
FIG. 4 is a high-level block diagram illustrating an example of a hardware architecture of a computing device that performs disclosed processes, in various embodiments.

FIG. 4 is a high-level block diagram illustrating an example of a hardware architecture of a computing device that performs disclosed processes, in various embodiments. The computing device 400 can serve as part of the LC device 100 to execute some or all of the processor executable process in response to instructions from the users (e.g., applying mechanical pressure on the surface of the device). In various embodiments, the computing device 400 includes a processor subsystem that includes one or more processors 402. Processor 402 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 400 can further include a memory 404, a network adapter 410 and a storage adapter 414, all interconnected by an interconnect 408. Interconnect 408 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The computing device 400 can be embodied as a single- or multi-processor system executing an operating system 406 that can implement a high-level module, e.g., a manager, to logically organize the information as a hierarchical structure of named directories, files and special types of files called virtual disks at the storage devices. The computing device 400 can further include graphical processing unit(s) for graphical processing tasks or processing non-graphical tasks in parallel.

The memory 404 can comprise storage locations that are addressable by the processor(s) 402 and adapters 410, and 414 for storing processor executable code and data structures. The processor 402 and adapters 410 and 414 may, in turn, comprise processing elements and/or logic circuitry configured to execute the software code and manipulate the data structures. The operating system 406, portions of which are typically resident in memory and executed by the processor(s) 402, functionally organizes the computing device 400 by (among other things) configuring the processor(s) 402 to invoke. It will be apparent to those skilled in the art that other processing and memory implementations, including various computer readable storage media, may be used for storing and executing program instructions pertaining to the technology.

The network adapter 410 can include multiple ports to couple the computing device 400 to one or more clients over point-to-point links, wide area networks, virtual private networks implemented over a public network (e.g., the Internet) or a shared local area network. The network adapter 410 thus can include the mechanical, electrical and signaling circuitry needed to connect the computing device 400 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 414 can cooperate with the operating system 406 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 414 can include multiple ports having input/output (I/O) interface circuitry that couples to the disks over an I/O interconnect arrangement, e.g., a conventional high-performance, Fibre Channel (FC) link topology. In various embodiments, the storage adapter 414 can be implemented as an adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A liquid crystal device, comprising:
a first conductive layer;
a second conductive layer; and
a liquid crystal film between the first and second conductive layers, the liquid crystal film including a first liquid crystal layer, a second liquid crystal layer and a middle polymer layer between the first and second liquid crystal layers;
wherein the first and second liquid crystal layers are configured to switch from a light scattering state to a light reflective state to display content, and the first and second liquid crystal layers are configured to switch from the light reflective state to the light scattering state to erase the content;
wherein during operation a portion of the first liquid crystal layer and a portion of the second liquid crystal layer are configured to switch from the light scattering state to the light reflective state to display the content in response to a mechanical pressure applied to a surface of the liquid crystal device at a place where the content is to be displayed without an electric field applied across the first and second liquid crystal layers.

2. The liquid crystal device of claim 1, wherein the first and second liquid crystal layers switch from the light scattering state to the light reflective state to display the content in response to a signal for displaying the content.

3. The liquid crystal device of claim 1, wherein a mechanical pressure applied to a surface of the liquid crystal device causes a portion of the first or second liquid crystal layer changes from a light scattering focal conic texture to a light reflective planar texture.

4. The liquid crystal device of claim 1, wherein the first and second liquid crystal layers switch from the light reflective state to the light scattering state to erase the content in response to a driving voltage applied between the first and second conductive layers.

5. The liquid crystal device of claim 1, wherein the liquid crystal film is manufactured using a roll-to-roll process.

6. The liquid crystal device of claim 1, wherein liquid crystal molecules of the first and second liquid crystal layers are separated from polymers of the middle polymer layer such that the polymers are not dispersed with the liquid crystal molecules and do not cause scattering between the polymers and the liquid crystal molecules.

7. The liquid crystal device of claim 6, wherein the scattering between the polymers and the liquid crystal molecules reduces a level of ambient light reflection of the liquid crystal molecules at the light reflective state.

8. The liquid crystal device of claim 1, wherein liquid crystal molecules of the first and second liquid crystal layers are separated from polymers of the middle polymer layer such that the polymers do not affect orientations of cholesteric liquid crystal helices of the first and second liquid crystal layers.

9. The liquid crystal device of claim 1, wherein the first or second liquid crystal layer includes a small amount of polymers permeated from the middle polymer layer to the first or second liquid crystal layer.

10. The liquid crystal device of claim 9, wherein the small amount of permeated polymers strengthen a mechanical structure of the liquid crystal film, and keep the first or second liquid crystal layer bistable when the first or second liquid crystal layer is switched between the light reflective state and the light scattering state.

11. The liquid crystal device of claim 1, wherein the middle polymer layer includes a small amount of liquid crystal molecules permeated from the first or second liquid crystal layer to the middle polymer layer.

12. The liquid crystal device of claim 1, wherein the small amount of permeated liquid crystal molecules improve a transmittance level of the liquid crystal film at the light scattering state due to an index matching caused by the permeated liquid crystal molecules in the middle polymer layer.

13. A method for manufacturing a liquid crystal device, comprising:
   producing a liquid crystal film including a polymer layer and at least one liquid crystal layer;
   curing the polymer layer such that polymers of the polymer layer and liquid crystal molecules of the liquid crystal layer are separated such that during operation at least a portion of the liquid crystal layer switches from a light scattering state to a light reflective state to display a content in response to a mechanical pressure applied at a place where the content is to be displayed without an electric field applied across the liquid crystal layer; and
   attaching a first conductive layer on top of the liquid crystal film and a second conductive layer on bottom of the liquid crystal film.

14. The method of claim 13, wherein the producing comprises: producing a liquid crystal film including the polymer layer and the at least one liquid crystal layer using a roll-to-roll process.

15. The method of claim 13, wherein the curing comprises:
   curing the polymer layer such that polymers of the polymer layer and liquid crystal molecules of the liquid crystal layer are separated, while a small amount of polymers are permeated from the polymer layer to the liquid crystal layer so that the small amount of permeated polymers strengthen a mechanical structure of the liquid crystal film, and keep the liquid crystal layer bistable when the liquid crystal layer is switched between a light reflective state and a light scattering state.

16. The method of claim 13, wherein the curing comprises:
   curing the polymer layer such that polymers of the polymer layer and liquid crystal molecules of the liquid crystal layer are separated, while a small amount of liquid crystal molecules are permeated from the first or second liquid crystal layer to the middle polymer layer so that the small amount of permeated liquid crystal molecules improve a transmittance level of the liquid crystal film at a light scattering state due to an index matching caused by the permeated liquid crystal molecules in the polymer layer.

17. A method for displaying content on a liquid crystal writing device, comprising:
   detecting a mechanical pressure applied at a place on a surface of the liquid crystal writing device;
   in response to the mechanical pressure, switching at least a portion of a liquid crystal film from a light scattering state to a light reflective state to display content at the place where the mechanical pressure is applied without an electric field applied across the liquid crystal film, wherein the liquid crystal film including a first liquid crystal layer, a second liquid crystal layer and a middle polymer layer between the first and second liquid crystal layers; and
   applying a voltage to conductive layers on and beneath the liquid crystal film to switch liquid crystal film from the light reflective light scattering state to the light scattering state.

18. The method of claim 17, wherein the content displayed on the liquid crystal writing device has a high brightness or a high contrast ratio because polymers of the middle polymer layer are not mixed with liquid crystal molecules of the first and second liquid crystal layers in a way that reduces a reflectance level of the liquid crystal film at the light reflective state.

19. The method of claim 17, wherein liquid crystal molecules of the first and second liquid crystal layers are separated from polymers of the middle polymer layer such that the polymers are not dispersed with the liquid crystal molecules and do not cause scattering between the polymers and the liquid crystal molecules.

20. A liquid crystal device, comprising:
   a first conductive layer;
   a second conductive layer; and
   a liquid crystal film between the first and second conductive layers, the liquid crystal film including a liquid crystal layer and a polymer layer;
   wherein the liquid crystal layer is configured to switch from a light scattering state to a light reflective state to display content, and the liquid crystal layer is configured to switch from the light reflective state to the light scattering state to erase the content;

wherein a portion of the liquid crystal layer is configured to switch from the light scattering state to the light reflective state to display the content in response to a mechanical pressure applied to a surface of the liquid crystal device at a place where the content is to be displayed without an electric field applied across the liquid crystal layer.

21. The liquid crystal device of claim 20, wherein the liquid crystal film including the liquid crystal layer and the polymer layer are manufactured by a roll-to-roll process.

22. The liquid crystal device of claim 20, wherein the content displayed on the liquid crystal device has a high brightness or a high contrast ratio because polymers of the polymer layer are not mixed with liquid crystal molecules of the liquid crystal layer and do not reduce a reflectance level of the liquid crystal film at the light reflective state.

\* \* \* \* \*